(12) United States Patent
Chen (10) Patent No.: US 6,694,570 B2
(45) Date of Patent: Feb. 24, 2004

(54) HINGE DEVICE (75) Inventor: Wu-Yung Chen, Taipei (TW)

(73) Assignee: Compal Electronics, Inc., Taiwan (CN)

( * ) Notice: Subject to any disclaimer, the term of this patent is extended or adjusted under 35 U.S.C. 154(b) by 0 days.

(21) Appl. No.: 10/189,573

(22) Filed: Jul. 8, 2002

(65) Prior Publication Data
US 2003/0167601 A1 Sep. 11, 2003

Related U.S. Application Data (63) Continuation-in-part of application No. 10/093,473, filed on Mar. 11, 2002.

(51) Int. Cl.[7] .............................. E05D 3/10; E05D 7/00
(52) U.S. Cl. ............................. 16/367; 16/365; 16/366; 248/919
(58) Field of Search .......................... 16/367, 365, 366; 361/680–682; 248/919–920

(56) References Cited

U.S. PATENT DOCUMENTS

| | | | | |
|---|---|---|---|---|
| 1,165,518 A | * | 12/1915 | Krell .......................... 16/334 |
| 1,649,951 A | * | 11/1927 | English ........................ 403/96 |
| 2,503,281 A | * | 4/1950 | Lynch et al. ................. 285/181 |
| 5,168,423 A | * | 12/1992 | Ohgami et al. .............. 361/681 |
| 5,168,429 A | * | 12/1992 | Hosoi .......................... 361/680 |
| 5,206,790 A | * | 4/1993 | Thomas et al. ............. 361/681 |
| 5,873,554 A | * | 2/1999 | Nobuchi ................... 248/278.1 |
| 6,275,376 B1 | * | 8/2001 | Moon .......................... 361/683 |

* cited by examiner

Primary Examiner—Anthony Knight
Assistant Examiner—Michael Kyle
(74) Attorney, Agent, or Firm—Bacon & Thomas, PLLC (57) ABSTRACT A hinge device for a foldable electronic apparatus. The hinge device includes an elongated main frame that extends along a first axis. A hinge unit includes an elongated pivot rod extending along the first axis and having a pivot end portion coupled pivotally to a stationary fixing block such that the pivot rod is rotatable axially about the first axis, and a connecting end portion connected to the main frame. A pivot unit includes an elongated pivot shaft extending along a second axis transverse to the first axis, and a pivot member coupled pivotally to the upper end portion of the pivot shaft, and adapted to be mounted on a cover member of the electric apparatus. A positioning unit is mounted on the cover member and is operable so as to engage the elongated main frame for preventing axial rotation of the cover member about the second axis.

7 Claims, 12 Drawing Sheets

HINGE DEVICE

CROSS-REFERENCE TO RELATED APPLICATION

This application is a continuation-in-part (CIP) of co-pending U.S. patent application Ser. No. 10/093,473, filed on Mar. 11, 2002, the entire disclosure of which is incorporated herein by reference.

BACKGROUND OF THE INVENTION

1. Field of the Invention

This invention relates to a hinge device, more particularly to a hinge device for a foldable electronic apparatus.

2. Description of the Related Art

A foldable electronic apparatus typically is made up of a display panel and a main body containing electronic components operating the electronic apparatus. The display panel is pivotally connected to the main body by a hinge device so that the display panel can be folded over the main body when the user has finished using the electronic apparatus. It is desirable to rotate and retain the display panel at an angle so that the display panel can be oriented in a suitable direction relative to the main body. In commonly assigned co-pending U.S. patent application Ser. No. 10/093,473, there is disclosed a hinge device as briefly described below.

In the hinge device, an elongated main frame extends along a first axis. A hinge unit includes an elongated pivot rod that extends along the first axis and that has a pivot end portion coupled pivotally to a stationary fixing block such that the pivot rod is rotatable axially about the first axis, and a connecting end portion connected to the main frame. A pivot unit includes an elongated pivot shaft that extends along a second axis transverse to the first axis. The pivot shaft has an upper end portion opposite to a lower end portion, which is coupled to the main frame, and projecting from the main frame. A pivot member is coupled pivotally to the upper end portion of the pivot shaft. A positioning unit is mounted on the main frame and is operable so as to prevent axial rotation of the pivot member about the second axis.

However, because the positioning unit is mounted on the main frame, damage to electrical wiring in the main frame is likely to occur.

SUMMARY OF THE INVENTION

Therefore, the main object of the present invention is to provide a hinge device that is free of the aforesaid drawback that is associated with the above design.

According to this invention, a hinge device for a foldable electronic apparatus includes an elongated main frame, a hinge unit, a pivot unit and a positioning unit. The electronic apparatus includes a main body and a cover member having a front portion, a back portion, and an end wall part that is connected to the front and back portions and that cooperates with the front and back portions to confine an inner receiving space.

The elongated main frame extends along a first axis, and has a first end portion and a second end portion opposite to the first end portion along the first axis.

The hinge unit includes a stationary fixing block and an elongated pivot rod. The stationary fixing block is adapted to be mounted on the main body. The elongated pivot rod extends along the first axis and has a pivot end portion coupled pivotally to the stationary fixing block such that the pivot rod is rotatable axially about the first axis, and a connecting end portion connected to the first end portion of the elongated main frame such that the elongated main frame is co-rotatable with the pivot rod relative to the stationary fixing block and the main body.

The pivot unit includes an elongated pivot shaft and a pivot member. The elongated pivot shaft extends along a second axis transverse to the first axis. The pivot shaft has a lower end portion coupled to the elongated main frame, and an upper end portion opposite to the lower end portion and projecting from the elongated main frame along the second axis. The pivot member is coupled pivotally to the upper end portion of the pivot shaft such that the pivot member is capable of rotating axially relative to the elongated main frame about the second axis. The pivot member is adapted to be mounted on the cover member.

The positioning unit is adapted to be mounted on the cover member and is operable so as to engage the elongated main frame for preventing axial rotation of the cover member about the second axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
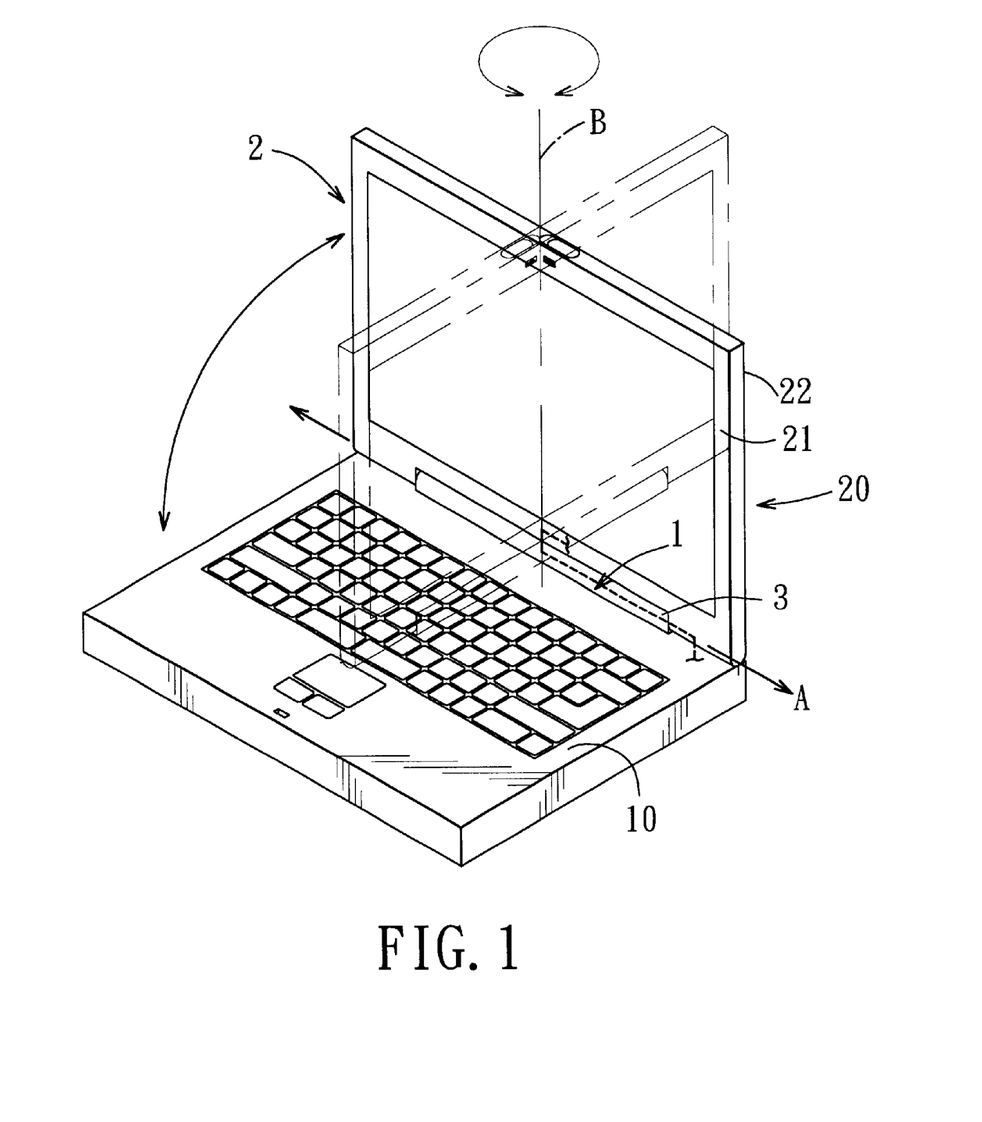
FIG. 1 is a perspective view illustrating how the cover member of a foldable electronic apparatus assembled with the preferred embodiment of a hinge device according to the present invention is rotated relative to the main body of the electronic apparatus.
Figure 2:
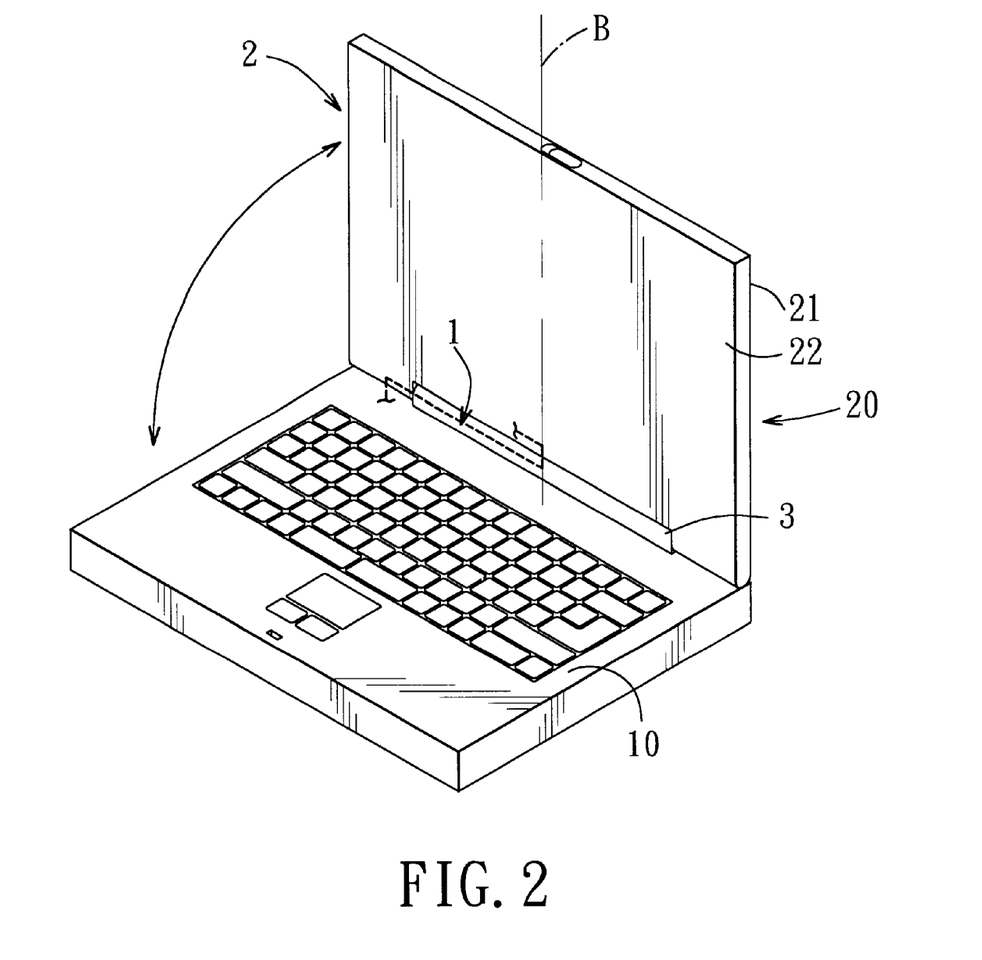
FIG. 2 is another perspective view illustrating the foldable electronic apparatus assembled with the preferred embodiment of a hinge device according to the present invention in a state of use.
Figure 3:
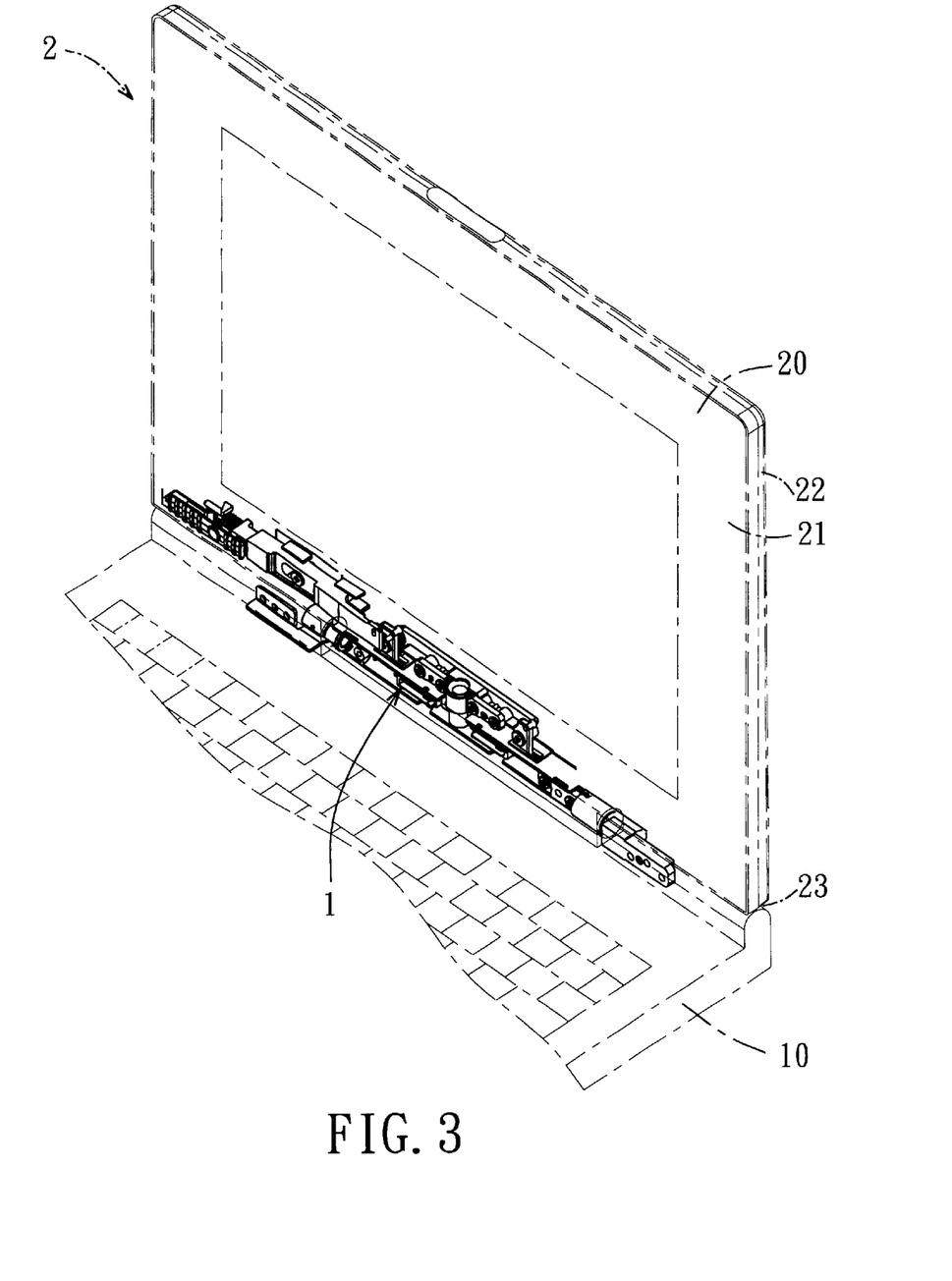
FIG. 3 is a fragmentary perspective view illustrating the preferred embodiment of the present invention when assembled on a foldable electronic apparatus.
Figure 4:
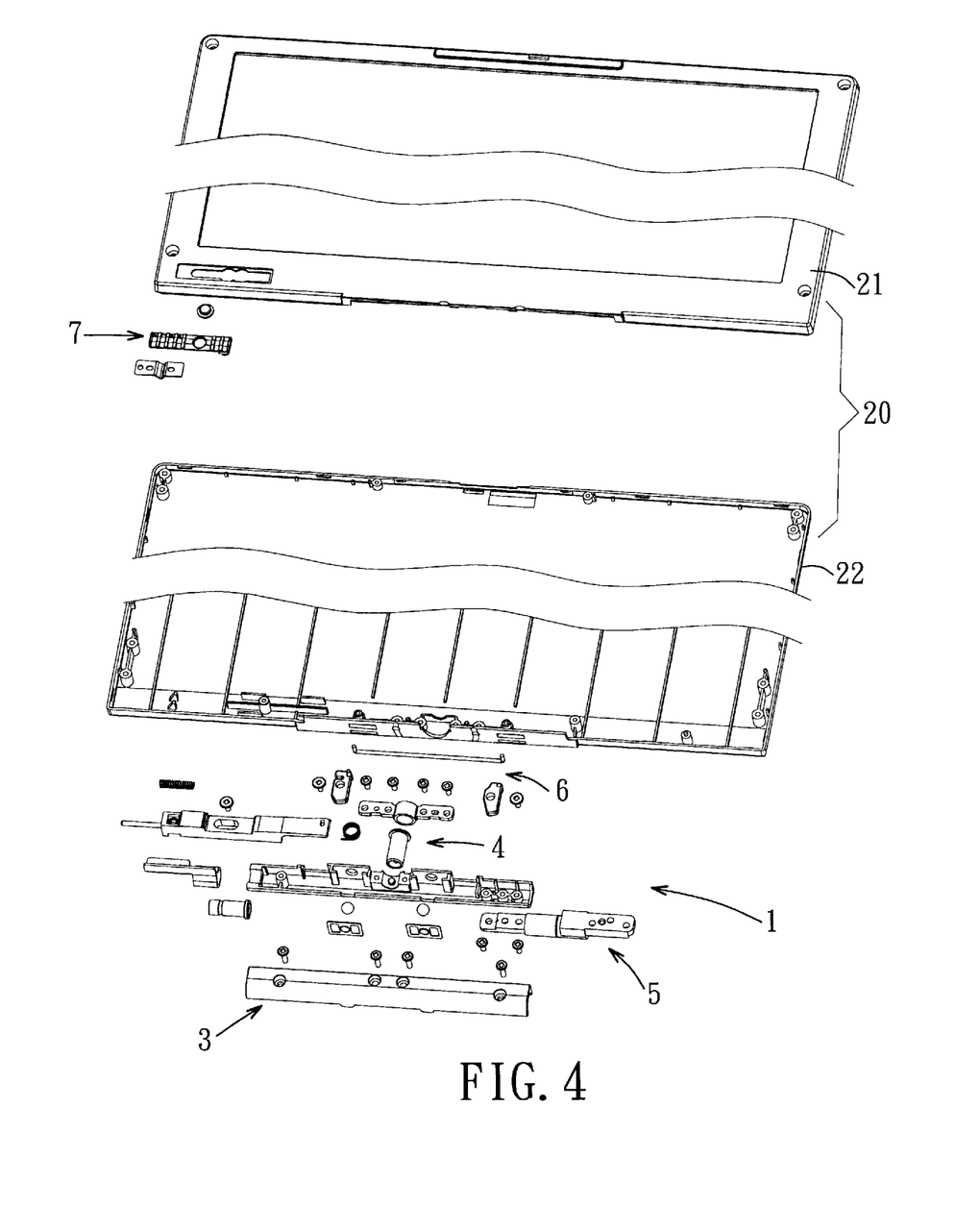
FIG. 4 is an exploded perspective view of the preferred embodiment and the cover member of the electronic apparatus.
Figure 5:
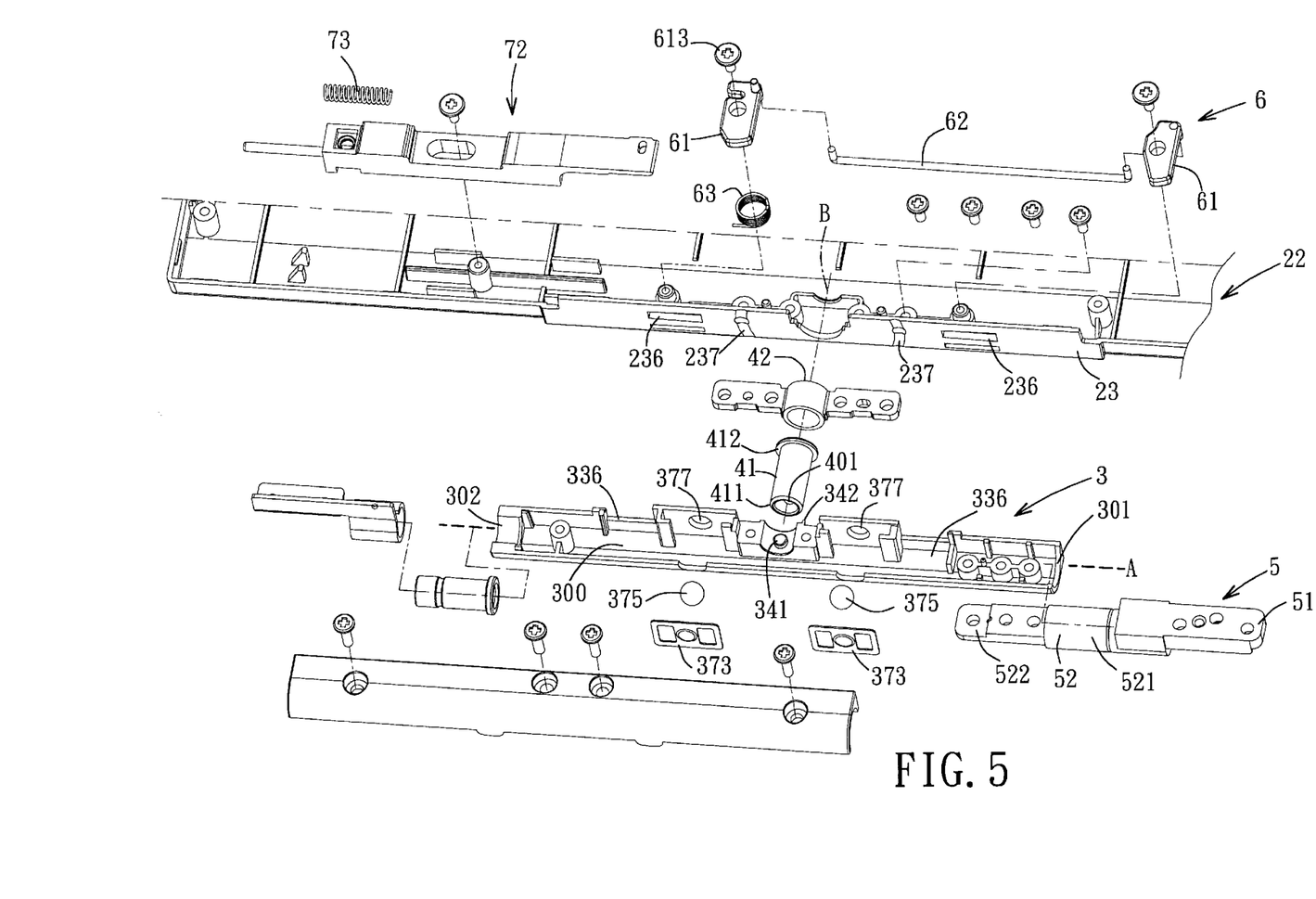
FIG. 5 is an enlarged exploded perspective view illustrating the preferred embodiment of the present invention.

Referring to FIGS. 4 and 5, the preferred embodiment of the hinge device 1 according to the present invention is shown to include an elongated main frame 3, a hinge unit 5, a pivot unit 4 and a positioning unit 6. In this embodiment, the hinge device 1 is adapted to be used to interconnect pivotally a main body 10 and a cover member 20 of a foldable electronic apparatus 2, as best shown in FIGS. 1, 2 and 3. The cover member 20 has a front portion 21, a back portion 22, and an end wall part 23 that is connected to the front and back portions 21, 22 and that cooperates with the front and back portions 21, 22 to confine an inner receiving space 200 (see FIG. 7).

The elongated main frame 3 extends along a first axis (A), and has a first end portion 301 and a second end portion 302 opposite to the first end portion 301 along the first axis (A). In this embodiment, the elongated main frame 3 confines an inner frame passage 300 that extends along the first axis (A).

The hinge unit 5 includes a stationary fixing block 51 and an elongated pivot rod 52. The stationary fixing block 51 is adapted to be mounted on the main body 10. The pivot rod 52 extends along the first axis (A) and has a pivot end portion 521 coupled pivotally to the stationary fixing block 51 such that the pivot rod 52 is rotatable axially about the first axis (A) and a connecting end portion 522 connected to the first end portion 301 of the elongated main frame 3 such that the elongated main frame 3 is co-rotatable with the pivot rod 52 relative to the stationary fixing block 51 and the main body 10. In this embodiment, the connecting end portion 522 extends into the inner frame passage 300 at the first end portion 301 of the elongated main frame 3.

The pivot unit 4 includes an elongated pivot shaft 41 that extends along a second axis (B) transverse to the first axis (A). The pivot shaft 41 has a lower end portion 411 coupled to the elongated main frame 3, and an upper end portion 412 opposite to the lower end portion 411 and projecting from the elongated main frame 3 along the second axis (B). The pivot unit 4 further has a pivot member 42 coupled pivotally to the upper end portion 412 of the pivot shaft 41 such that the pivot member 4 is capable of rotating axially relative to the elongated main frame 3 about the second axis (B). In this embodiment, the pivot member 4 is adapted to be mounted on the back position 22 of the cover member 20 (see FIG. 10). The lower end portion 411 of the pivot shaft 41 extends into the inner frame passage 300 of the elongated main frame 3 and is formed with a radial pin hole 401. The elongated main frame 3 has a pin 341 that projects into the pin hole 401 so as to prevent rotation of the pivot shaft 41 about the second axis (B). In this embodiment, the elongated main frame 3 is further formed with a limit projection 342 to limit a complete circular rotation of the pivot member 42 about the second axis (B) As such, further clockwise rotation of the cover member 20 about the second axis (B) can be arrested at the position shown in FIG. 2.

Figure 6:
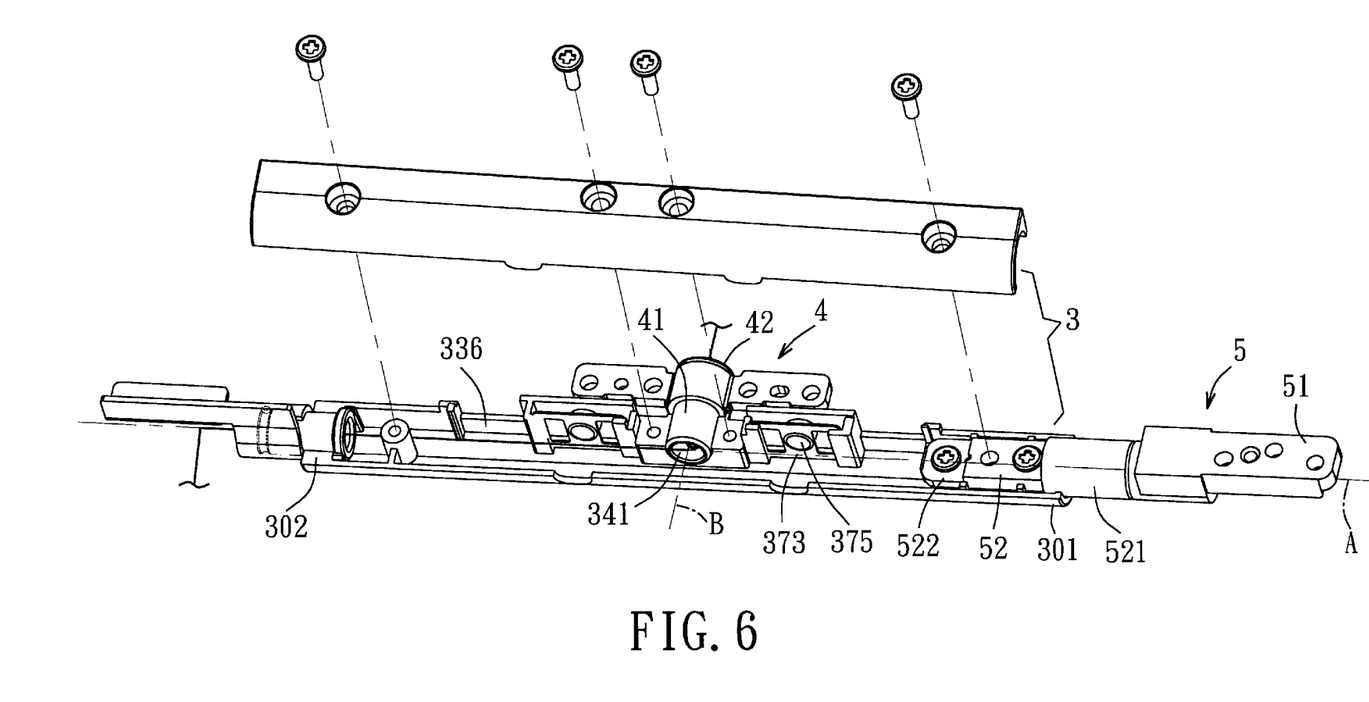
FIG. 6 is a fragmentary perspective view to illustrate the preferred embodiment of the present invention in an assembled state.
Figure 10:
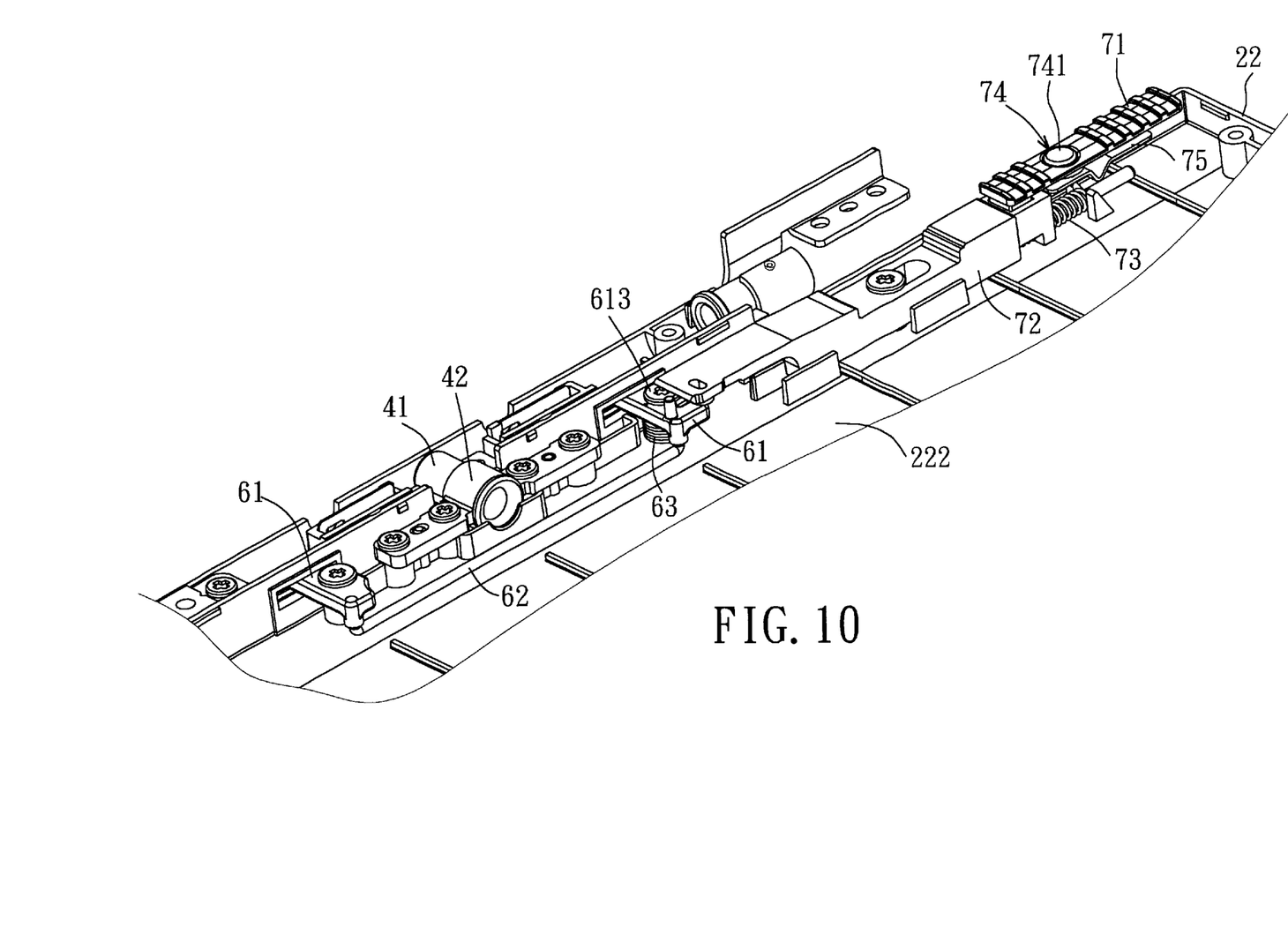
FIG. 10 is a fragmentary perspective view showing the preferred embodiment when assembled on the foldable electronic apparatus.
Figure 11:
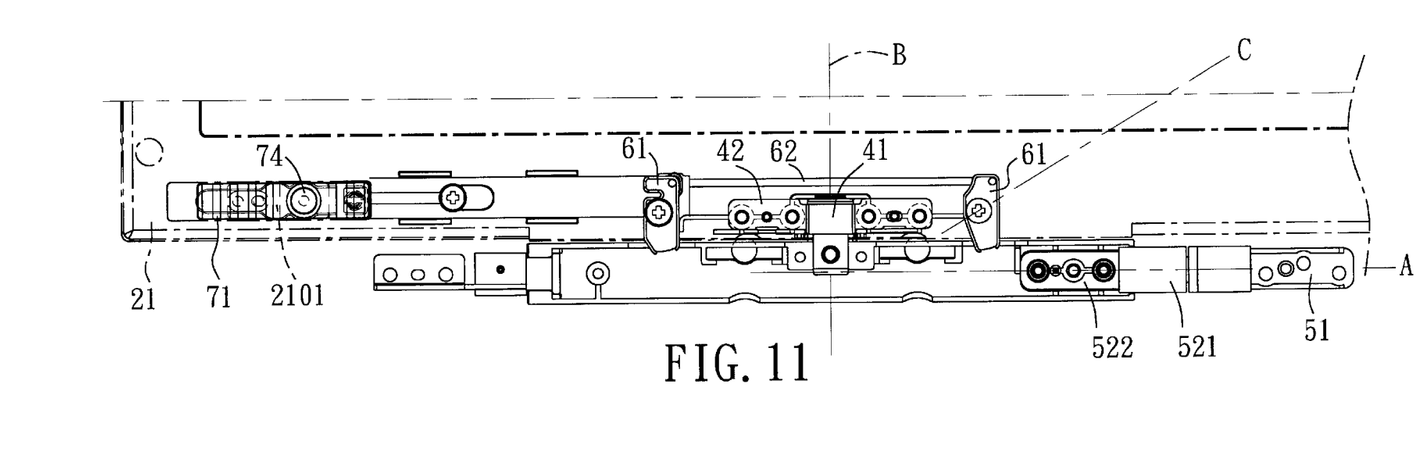
FIG. 11 is a fragmentary schematic front view illustrating the preferred embodiment when assembled on the foldable electronic apparatus and when the positioning blocks of the preferred embodiment are disposed at a first position.
Figure 12:
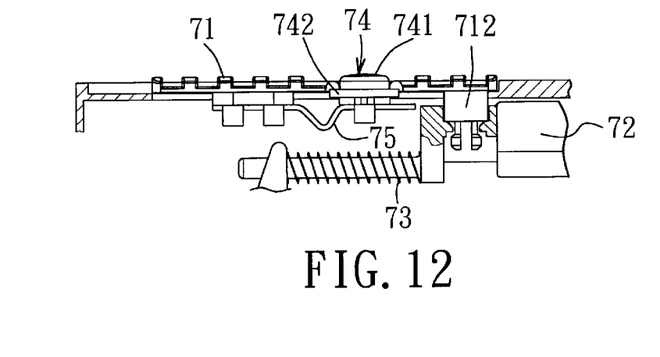
FIG. 12 is a fragmentary schematic view illustrating the operating unit of the preferred embodiment shown in FIG. 11.
Figure 13:
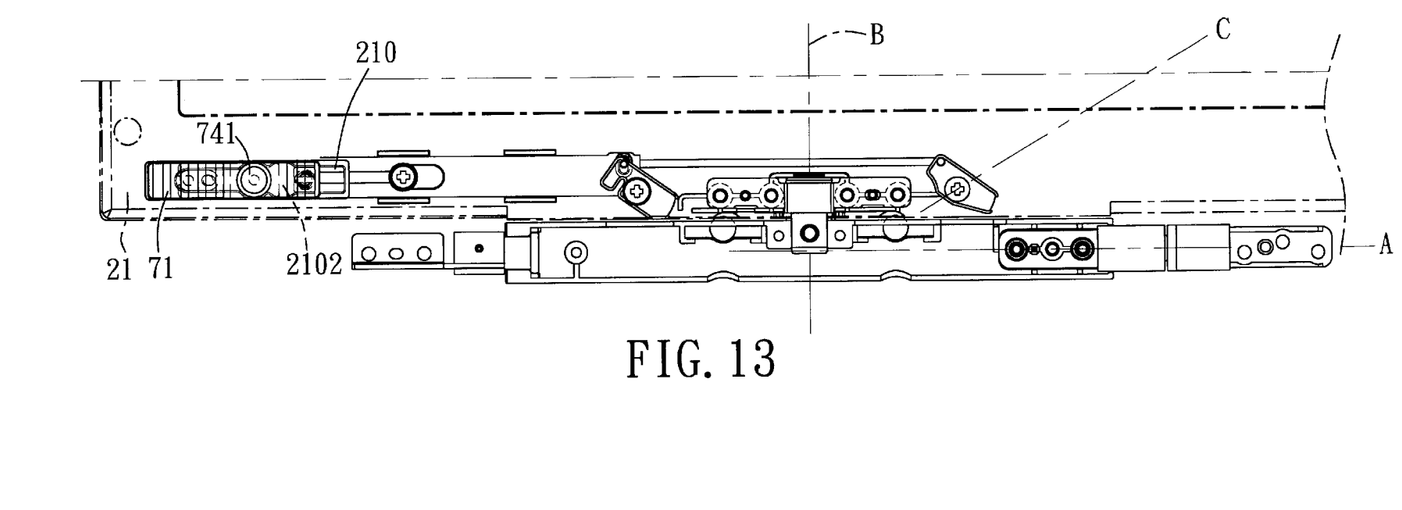
FIG. 13 is a fragmentary schematic front view illustrating the preferred embodiment when assembled on the foldable electronic apparatus and when the positioning blocks of the preferred embodiment are disposed at a second position.
Figure 14:
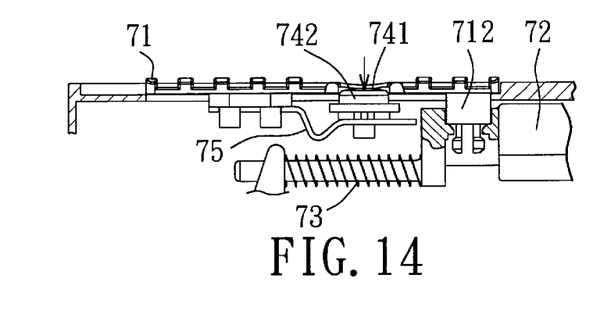
FIG. 14 is a fragmentary schematic view illustrating the operating unit of the preferred embodiment shown in FIG. 13.
Figure 15:
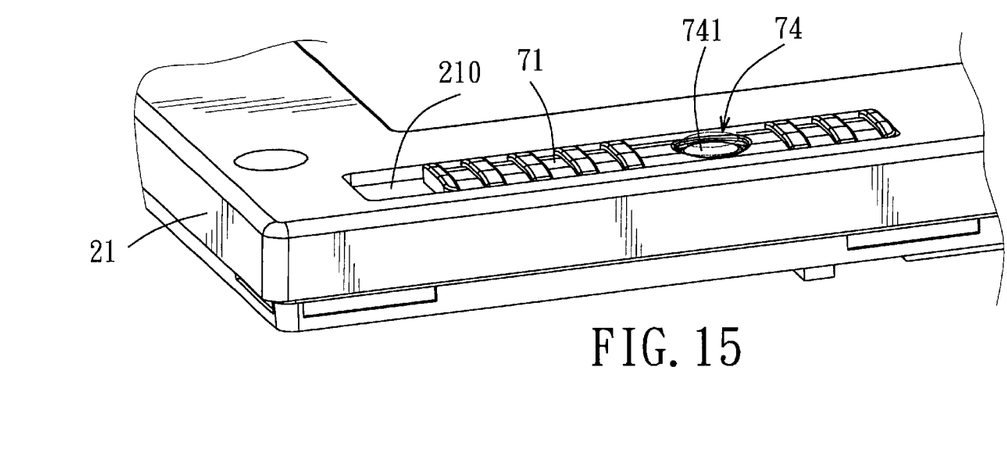
FIG. 15 is a fragmentary perspective view illustrating the operating unit of the preferred embodiment.

The positioning unit 6 is adapted to be mounted on the cover member 20 and is operable so as to engage the elongated main frame 3 for preventing axial rotation of the cover member 20 about the second axis (B). In this embodiment, the end wall part 23 of the cover member 20 has a pair of positioning holes 236, and the elongated main frame 3 has a pair of engaging holes 336 to be registered with the positioning holes 236, respectively (see FIG. 5). The positioning unit 6 includes a pair of positioning blocks 61 and a connecting rod 62. Each of the positioning blocks 61 is adapted to be disposed in the inner receiving space 200 and is adapted to be mounted on the cover member 20 such that each of the positioning blocks 61 is registered with a respective one of the positioning holes 236 and is rotatable about a respective third axis (C) transverse to the first and second axes (A), (B) between a first position, wherein the positioning blocks 61 are adapted to extend through the respective one of the positioning holes 236 into a respective one of the engaging holes 336 (see FIG. 11), and a second position, wherein the positioning blocks 61 are adapted to be retracted fully into the inner receiving space 200 (see FIG. 13). The connecting rod 62 is adapted to be disposed in the inner receiving space 200 and interconnects the positioning blocks 61 to ensure simultaneous rotation of the positioning blocks 61. In this embodiment, the end wall part 23 of the cover member 20 is further formed with a pair of ball grooves 237. The elongated main frame 3 is formed with a pair of ball holes 377 to be registered with the ball grooves 237, respectively (see FIG. 5). The positioning unit 6 further includes a pair of resilient plates 373 and a pair of positioning balls 375 (see FIG. 6). Each of the resilient plates 373 is mounted in the inner frame passage 300 and is registered with a respective one of the ball holes 377. Each of the positioning balls 375 is biased by a respective one of the resilient plates 373 to protrude outwardly of the inner frame passage 300 via a respective one of the ball holes 377 so as to be adapted to engage a respective one of the ball grooves 237. It is noted that the hinge device 1 further includes a biasing unit for biasing the positioning blocks 61 to the first position. In this embodiment, the biasing unit is a torsion spring 63 mounted in the inner receiving space 200. The torsion spring 63 is sleeved on a bolt 613 and engages one of the poisoning blocks 61 and a rear wall 222 of the back portion 22 of the cover member 20, as best shown in FIG. 10.

In this embodiment, the hinge device 1 further comprises an operating unit 7 (see FIG. 4) adapted to be mounted on the cover member 20 and operable so as to move the positioning blocks 61 from the first position to the second position. The front portion 21 of the cover member 20 is formed with an operating hole 210 including first and second restricting sections 2101, 2102 corresponding respectively to the first and second positions of the positioning blocks 61 (see FIG. 8). The operating unit 7 includes an operating member 71 and an abutting block 72 (see FIG. 9). The operating member 71 has an operating portion 711 adapted to be mounted movably on the front portion 21 of the cover member 20, and a coupling portion 712 extending from the operating portion 711 and adapted to extend into the inner receiving space 200 via the operating hole 210 (see FIGS. 12 and 14). The abutting block 72 is adapted to be disposed in the inner receiving space 200, is coupled to the coupling portion 712 of the operating member 71, and engages one of the positioning blocks 61 (see FIG. 10). The operating member 71 is operable so as to drive the abutting block 72 for moving the positioning blocks 61 from the first position to the second position (see FIGS. 11 and 13). In this embodiment, the operating unit 7 further includes a biasing member 73 for biasing the abutting block 72 to the first position (see FIG. 10). As shown in FIGS. 8 to 15, in this embodiment, the operating unit 7 further includes a button 74 having a smaller operating part 741 disposed in a button hole 710 found in the operating portion 711 of the operating member 71, and a larger restricting part 742 connected to the smaller operating part 741 and adapted to be disposed removably in a selected one of the first and second restricting sections 2101, 2102 of the operating hole 210 to arrest undesired movement of the operating member 71 relative to the cover member 20. The operating unit 7 further includes a spring unit 75 connected to the operating member 71 and the button 74 for biasing the larger restricting part 742 toward the operating member 71. The button 74 is operable so as to remove the larger restricting part 742 from one of the first and second restricting sections 2101, 2102 of the operating hole 210 and to extend the smaller operating part 741 into said one of the first and second restricting sections 2101, 2102 of the operating hole 210 so as to permit movement of the positioning blocks 61 from one of the first and second positions to the other one of the first and second positions(see FIGS. 11 to 14).

Figure 7:
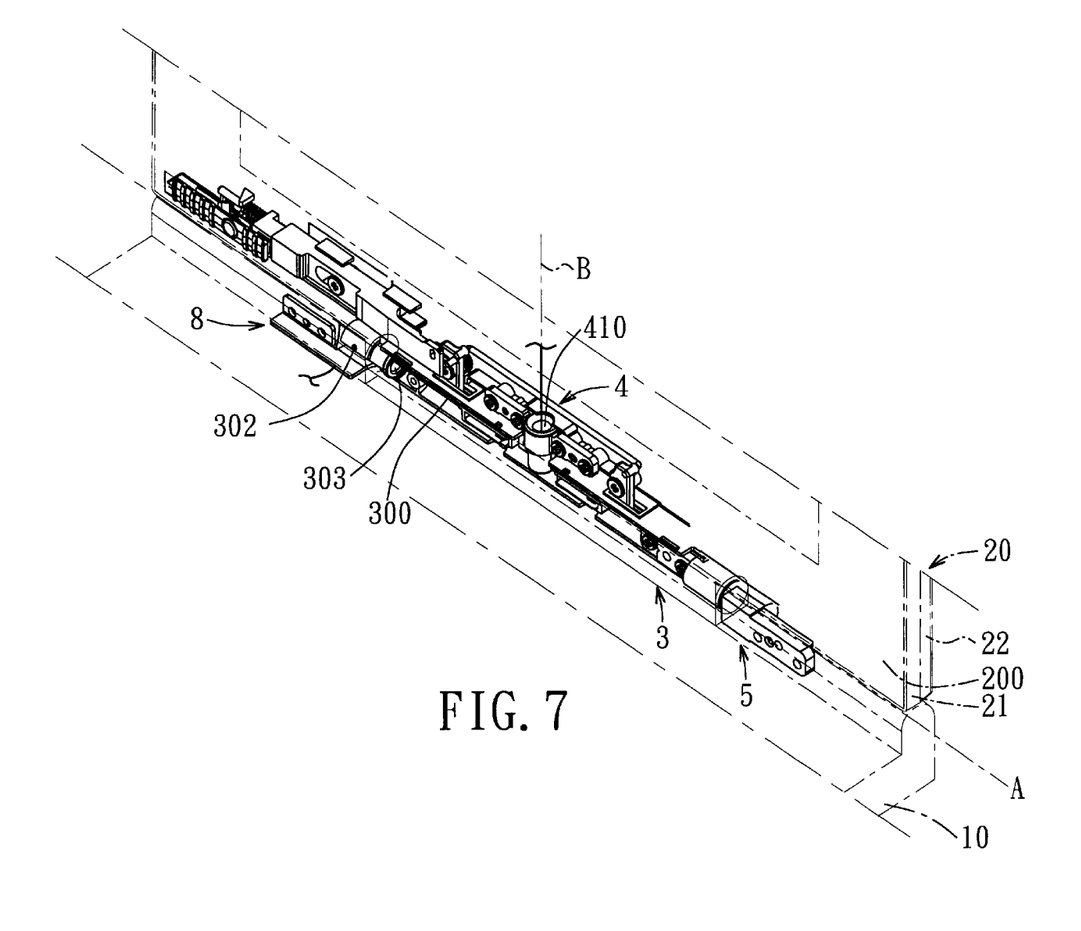
FIG. 7 is a perspective view of the preferred embodiment of the present invention when assembled on the foldable electronic apparatus.
Figure 8:
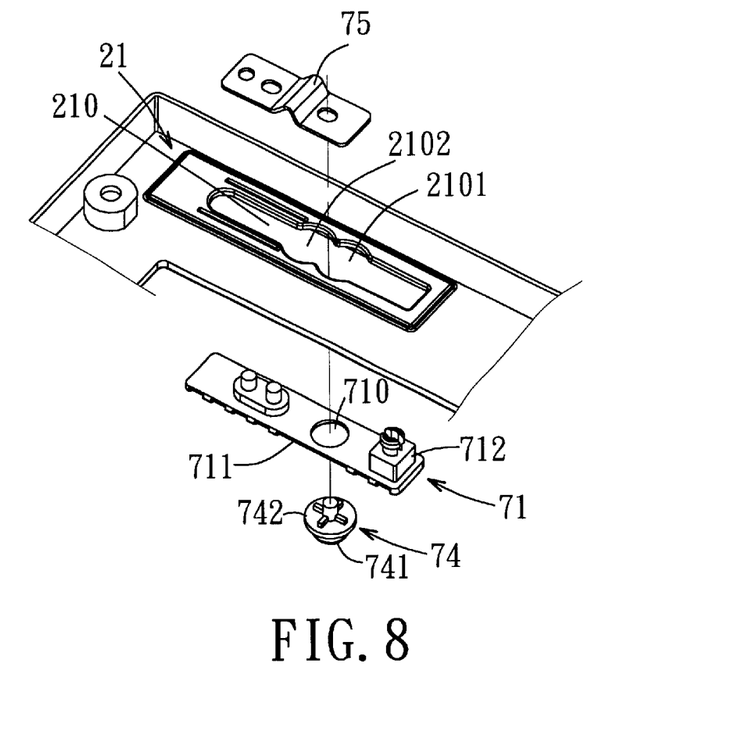
FIG. 8 is an exploded perspective view to illustrate an operating unit of the preferred embodiment.
Figure 9:
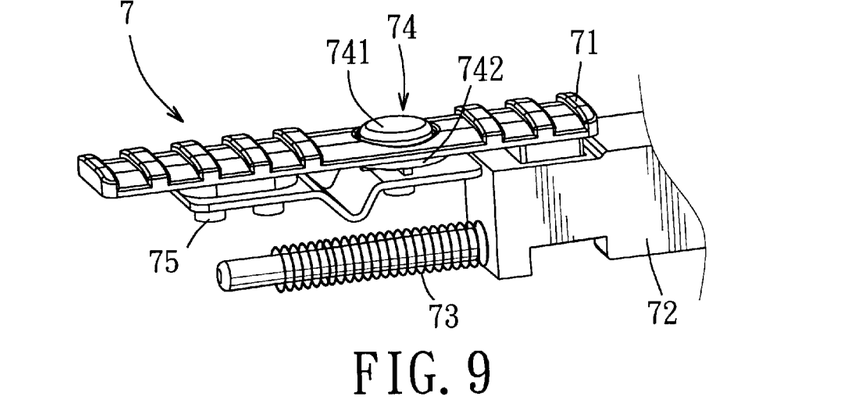
FIG. 9 is an assembled perspective view illustrating the operating unit of the preferred embodiment.

Referring FIG. 7, in this embodiment, the pivot shaft 41 is tubular and confines a wiring passage 410. The hinge device 1 further includes a mounting unit 8 coupled pivotally to the second end portion 302 of the elongated main frame 3 and cooperating with the second end portion 302 of the elongated main frame 3 to confine an access hole 303 that is communicated with the inner frame passage 300 and the wiring passage 410. As such, electric wiring (not shown) for interconnecting electrically components in the main body 10 and those in the cover member 20 can be received in the inner receiving space 200 via the access hole 303 and the pivot shaft 41.

Therefore, when the positioning blocks 61 are disposed at the first position, the cover member 20 is adapted to be co-rotatable with the pivot rod 52 relative to the stationary fixing block 51 and the main body 10 about the first axis (A), as shown in FIG. 1. When the positioning blocks 61 are disposed at the second position, the cover member 20 is adapted to rotatable with the pivot member 42 relative to the elongated main frame 3 and the main body 10 about the second axis (B), as shown in FIG. 1. Furthermore, since the positioning unit 6 is mounted on the cover member 20, operation of the positioning unit 6 will not affect electrical wiring in the elongated main frame 3.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A hinge device for a foldable electronic apparatus, the electronic apparatus including a main body and a cover member having a front portion, a back portion, and an end wall part that is connected to the front and back portions and that cooperates with the front and back portions to confine an inner receiving space, said hinge device comprising:

an elongated main frame extending along a first axis, and having a first end portion and a second end portion opposite to said first end portion along said first axis;

a hinge unit including a stationary fixing block adapted to be mounted on the main body, and an elongated pivot rod that extends along said first axis and that has a pivot end portion coupled pivotally to said stationary fixing block such that said pivot rod is rotatable axially about said first axis, and a connecting end portion connected to said first end portion of said elongated main frame such that said elongated main frame is co-rotatable with said pivot rod relative to said stationary fixing block and the main body;

a pivot unit including an elongated pivot shaft that extends along a second axis transverse to said first axis, said pivot shaft having a lower end portion coupled to said elongated main frame, and an upper end portion opposite to said lower end portion and projecting from said elongated main frame along said second axis, said pivot unit further having a pivot member coupled pivotally to said upper end portion of said pivot shaft such that said pivot member is capable of rotating axially relative to said elongated main frame about said second axis, said pivot member being adapted to be mounted on the cover member;

a positioning unit adapted to be mounted on the cover member and operable so as to engage said elongated main frame for preventing axial rotation of the cover member about said second axis;

said elongated main frame confines an inner frame passage that extends along said first axis; and the end wall part being formed with a ball groove; and wherein said elongated main frame is formed with a ball hole to be registered with the ball groove, said hinge device further comprising:

a resilient plate mounted in said inner frame passage and registered with said ball hole, and a ball biased by said resilient plate to protrude outwardly of said inner frame passage via said ball hole so as to be adapted to engage the ball groove.

2. A hinge device for a foldable electronic apparatus, the electronic apparatus including a main body and a cover member having a front portion, a back portion, and an end wall part that is connected to the front and back portions and that cooperates with the front and back portions to confine an inner receiving space, said hinge device comprising:

an elongated main frame extending along a first axis, and having a first end portion and a second end portion opposite to said first end portion along said first a hinge unit including a stationary fixing block adapted to be mounted on the main body, and an elongated pivot rod that extends along said first axis and that has a pivot end portion coupled pivotally to said stationary fixing block such that said pivot rod is rotatable axially about said first axis, and a connecting end portion connected to said first end portion of said elongated main frame such that said elongated main frame is co-rotatable with said pivot rod relative to said stationary fixing block and the main body;

a pivot unit including an elongated pivot shaft that extends along a second axis transverse to said first axis, said pivot shaft having a lower end portion coupled to said elongated main frame, and an upper end portion opposite to said lower end portion and projecting from said elongated main frame along said second axis, said pivot unit further having a pivot member coupled pivotally to said upper end portion of said pivot shaft such that said pivot member is capable of rotating axially relative to said elongated main frame about said second axis, said pivot member being adapted to be mounted on the cover member;

a positioning unit adapted to be mounted on the cover member and operable so as to engage said elongated main frame for preventing axial rotation of the cover member about said second axis; and the end wall part being formed with a pair of positioning holes, wherein said elongated main frame is formed with a pair of engaging holes to be registered with the positioning holes, respectively, said positioning unit including:
- a pair of positioning blocks, each of which is adapted to be disposed in the inner receiving space and is adapted to be mounted on the cover member such that each of said positioning blocks is registered with a respective one of the positioning holes and is rotatable about a respective third axis transverse to said first and second axes between a first position, wherein said positioning blocks are adapted to extend through the respective one of the positioning holes and into a respective one of said engaging holes, and a second position, wherein said positioning blocks are adapted to be retracted fully into the inner receiving space; and
- a connecting rod adapted to be disposed in the inner receiving space and interconnecting said positioning blocks to ensure simultaneous rotation of said positioning blocks.

3. The hinge device as claimed in claim 2, further comprising a biasing unit for biasing said positioning blocks to said first position.

4. The hinge device as claimed in claim 3, further comprising an operating unit adapted to be mounted on the cover member and operable so as to move said positioning blocks from said first position to said second position.

5. The hinge device as claimed in claim 4, the front portion of the cover member being formed with an operating hole, wherein said operating unit includes:

an operating member having an operating portion adapted to be mounted movably on the front portion of the cover member, and a coupling portion extending from said operating portion and adapted to extend into the inner receiving space via the operating hole; and an abutting block adapted to be disposed in the inner receiving space, coupled to said coupling portion of said operating member, and engaging one of said positioning blocks;

said operating member being operable so as to drive said abutting block for moving said positioning blocks from said first position to said second position.

6. The hinge device as claimed in claim 5, wherein said operating unit further includes a biasing member for biasing said abutting block to said first position.

7. The hinge device as claimed in claim 5, the operating hole including first and second restricting sections corresponding respectively to said first and second positions of said positioning blocks, wherein said operating portion of said operating member is formed with a button hole smaller than the first and second restricting sections, said operating unit further including a button having a smaller operating part disposed in said button hole and a larger restricting part connected to said smaller operating part and adapted to be disposed removably in a selected one of the first and second restricting sections of the operating hole to arrest undesired movement of said operating member relative to the cover member, said operating unit further including a spring unit connected to said operating member and said button for biasing said larger restricting part toward said operating member, said button being operable so as to remove said larger restricting part from one of the first and second restricting sections of the operating hole and to extend said smaller operating part into said one of the first and second restricting sections of the operating hole so as to permit movement of said positioning blocks from one of said first and second positions to the other one of said first and second positions.

* * * * *